J. F. APPLEBY.
COTTON PICKING MACHINE.
APPLICATION FILED AUG. 15, 1908.
977,155.
Patented Nov. 29, 1910.
2 SHEETS—SHEET 2.
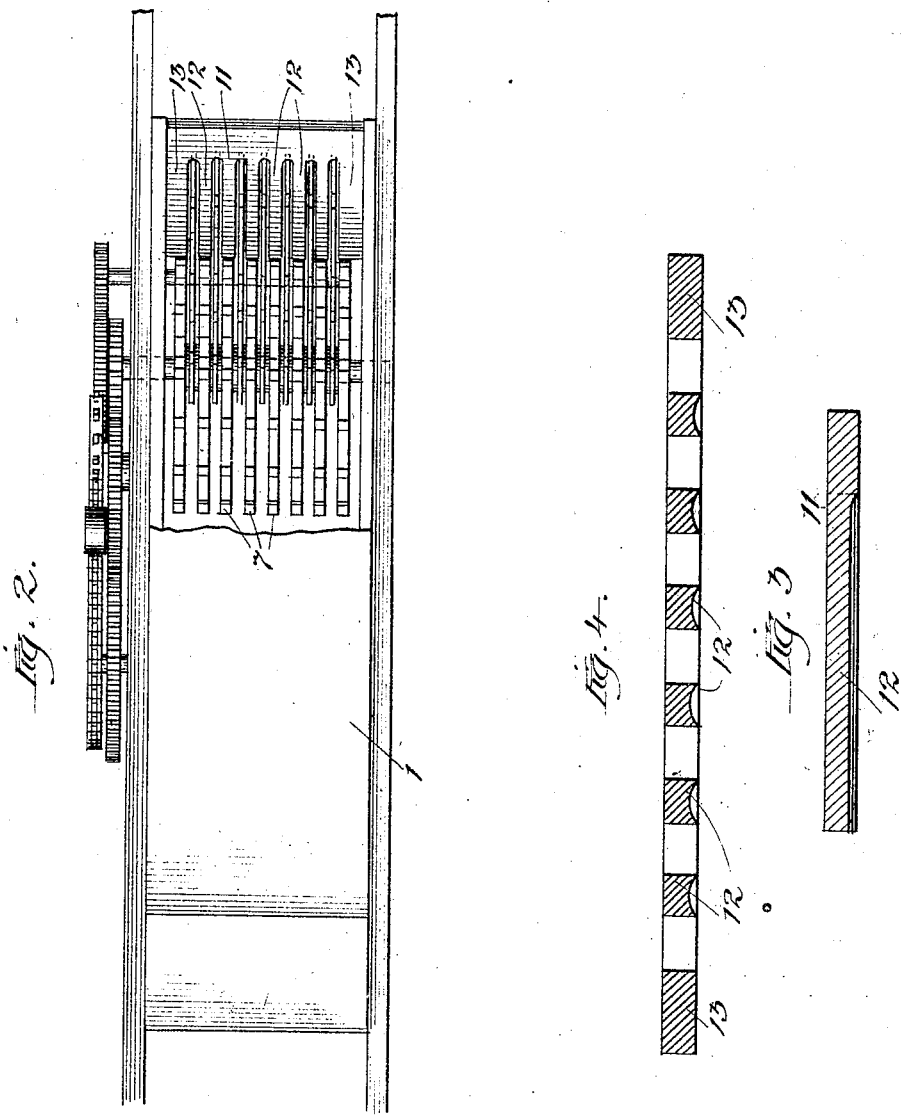
Witnesses:
Frank J. Blanchard
David E. Hulfish
Inventor:
John F. Appleby.
By G. L. Cragg
Attorney.

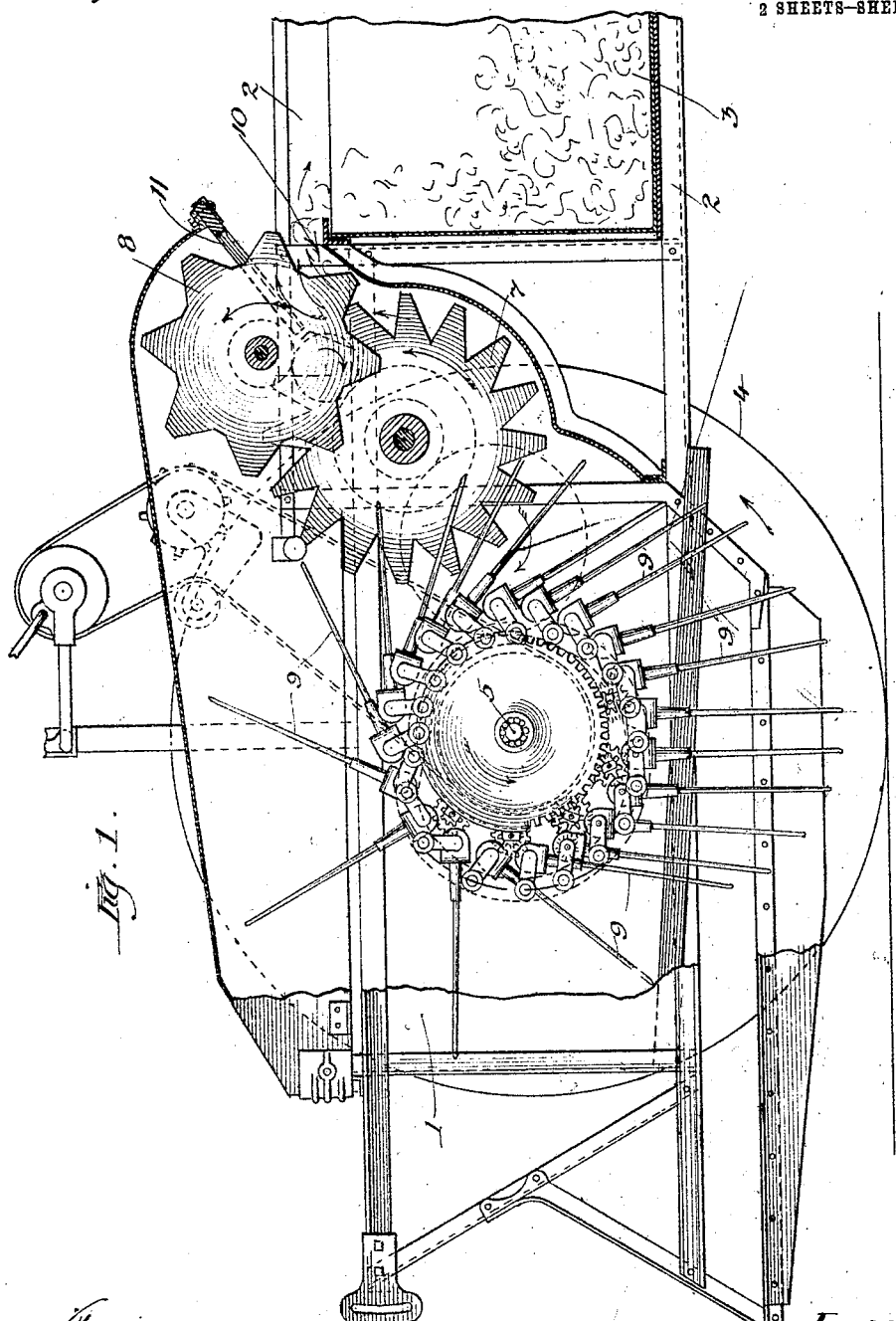

UNITED STATES PATENT OFFICE.

JOHN F. APPLEBY, OF CHICAGO, ILLINOIS.

COTTON-PICKING MACHINE.

977,155.  Specification of Letters Patent.  Patented Nov. 29, 1910.

Application filed August 15, 1906. Serial No. 330,744.

*To all whom it may concern:*

Be it known that I, JOHN F. APPLEBY, a citizen of the United States, residing at Chicago, in the county of Cook and State of Illinois, have invented a certain new and useful Improvement in Cotton-Picking Machines, of which the following is a full, clear, concise, and exact description, reference being had to the accompanying drawings, forming a part of this specification.

My invention relates to cotton picking machines, and is of particular service in connection with that class of machines exhibited in my United States Patent numbered 798,651, dated September 5, 1905, though I do not wish to be limited to the precise class of machine in connection with which the present invention is shown.

Difficulty has been found in cotton harvesting machines with respect to the loose cotton that is thrown into the way by rapidly moving parts of the machine. For example, in the machine disclosed in my aforesaid patent the cotton at times is likely to be cast forward by the cleaning wheels so as to escape the discharge opening and fall upon the ground. I overcome this objectionable characteristic in cotton harvesting machines by interposing a fender in what would otherwise be a path non-coincident with that including the discharge opening or passage. This fender serves to intercept the cotton that would otherwise escape the discharge opening or passage and returns the same to the path which the balance of the picked cotton naturally follows. As the improperly deflected cotton was hitherto diverted from its proper course owing to the air currents created by the rapidly moving machinery, I preferably not only provide the fender for intercepting the cotton, but provide means for creating currents of air that act to confine what otherwise might be stray cotton to its proper courses. This means for creating currents of air for selected direction, desirably resides in the fender itself or a supplemental portion thereof, this supplemental portion thereof desirably being in the form of teeth interposed between the cleaning wheels and constituting with the balance of the fender, a comb. The teeth of the comb have their under faces curved, the curved surfaces being segmental portions of cylindrical surfaces, which curved surfaces extend longitudinally of the teeth of the comb. The base or balance of the fender need not be provided with such curvature. These curvatures are provided in the bottoms of the teeth and face the approaching cotton, and serve to direct currents of air, and thereby promote the passage of the cotton through the discharge opening into the suitable receptacle that may be carried by the harvester.

I will explain my invention more fully by reference to the accompanying drawings, in which—

Figure 1 is a view in sectional elevation of a machine showing the preferred form of the invention. Fig. 2 is a plan view of so much of the machine shown in Fig. 1 as is necessary to an understanding of the invention. Fig. 3 is a longitudinal sectional view through one of the teeth. Fig. 4 is a cross-sectional view of the comb, taken through its teeth.

Like parts are indicated by similar characters of reference throughout the different figures.

The picking, stripping and cleaning mechanism is mounted within a housing 1 having a porch 2 upon which a basket 3 that is to receive the picked cotton, is placed. The vehicle wheels 4 constitute the means for operating the main driving shaft 5 desirably according to the construction illustrated in my aforesaid patent. The main shaft 5 operates the gearing, which causes the actuation of the stripping wheels 7 and the cleaning wheels 8 desirably in the directions indicated by the arrows. The general construction and arrangement of the stripping and cleaning wheels 7 and 8 is desirably similar to that shown in my aforesaid patent, though there are some departures in detail. The cleaning wheels 8 are desirably each formed in separate disks, as are the stripping wheels 7, though as these wheels constitute peripherally slotted cylinders, I do not wish to be limited to a construction wherein said wheels are separately formed to constitute the cylinders of which they are parts, nor do I wish to be limited to the use of wheels in all embodiments of the invention, for stripping and cleaning purposes.

As the machine illustrated is one adapted for picking short staple cotton, the cotton picking fingers 9 are bodily moved longitudinally of the machine in the direction indicated by the arrow and in vertical planes, said fingers being caused to rotate about their axes when they are in the bushes, and preferably caused to cease their rotation when they are out of bushes, all as appears in my aforesaid patent, the fingers being protected in different directions as they are bodily moved, in order that they may move substantially vertically within the bushes, as also appears in my said patent. The fingers, with the cotton they have gathered from the bushes, are passed between the wheels 7 of the stripping mechanism, the teeth provided upon the periphery of the wheels 7 effecting removal of the cotton. The function of the wheels 8, which are interposed between wheels 7 (there being preferably but one wheel 8 in each of the slots between the wheels 7) is to remove the cotton gathered by the strippers 7 and to eject it through the passage-way or opening 10, that permits the cotton to be thrown into the basket 3. Hitherto, however, because of the air currents created by the rapidly moving parts, some of the cotton has in some operations of the machine, found escape from the passage 10, being carried by these air currents toward the forward part of the machine, whence it will find lodgment upon the ground. Upon investigation, I found that this stray cotton could be intercepted and caused to follow through the opening 10, by placing a fender 11 along the upper margin of said opening, against the lower surface of which the cotton would strike and be caused to fall into the basket 3. In order that this function might be most effectively accomplished, I have provided with said fender supplemental finger portions 13, in the form of teeth, that slope downwardly, that is, the teeth 12 are provided with a common base, the part 11 first mentioned, to constitute the comb. These teeth 12 have their under faces scalloped to constitute groove-ways or channels in their bottoms whereby well defined air currents are created, which serve in coöperation with the fender, to direct the cotton through the opening 10 into the basket. In the sense implied herein the wheels 7, 8, together constitute stripping mechanism, the wheels 7 stripping the fingers, while the wheels 8 strip, remove or clean the cotton from the wheel 7.

While I prefer the location of the fender as illustrated, and desirably provide the same with the teeth 12, I do not wish to be limited to these characteristics, as it is obvious that departures may be made in the embodiment of the invention shown, without departing from the spirit thereof.

It will be seen that I have provided a cotton picking machine including picking and stripping mechanism and having a passage through which the stripped cotton is cast by the stripping mechanism, and a fender constituting an upper wall of said passage and serving to intercept cotton that is not cast by the stripping mechanism through said passage, whereby substantially all of the cotton being discharged is forced to pass through the passage of which said fender forms a wall, said fender including projecting teeth while the stripping element includes wheels passing between said teeth.

Having thus described my invention, I claim as new and desire to secure by Letters-Patent:—

1. A cotton picking machine including picking and stripping mechanism and having an opening through which the stripped cotton is discharged, and a fender for intercepting cotton cast from the machine, said fender including projecting teeth, which are channeled to cause the air to follow directions to promote the exit of the cotton through said opening, said stripping mechanism including wheels disposed between the teeth.

2. A cotton picking machine including picking and stripping mechanism and having an opening through which the stripped cotton is discharged, a fender for intercepting cotton cast from the machine, said fender including projecting teeth, and a base portion from which the teeth project, said teeth being channeled to cause the air to follow directions to promote the exit of the cotton through said opening, said stripping mechanism including wheels disposed between the teeth.

3. A cotton picking machine including picking and stripping mechanism and having a passage through which the stripped cotton is cast by the stripping mechanism, and a fender constituting an upper wall of said passage and serving to intercept cotton that is not cast by the stripping mechanism through said passage, whereby substantially all of the cotton being discharged is forced to pass through the passage of which said fender forms a wall, said fender including projecting teeth while the stripping element includes wheels passing between said teeth.

4. A cotton picking machine including picking and stripping mechanism and having a passage through which the stripped cotton is cast by the stripping mechanism, and a fender constituting an upper wall of said passage and serving to intercept cotton that is not cast by the stripping mechanism through said passage, whereby substantially all of the cotton being discharged is forced to pass through the passage of which said fender forms a wall.

In witness whereof, I hereunto subscribe my name this 8th day of August A. D., 1906.

JOHN F. APPLEBY.

Witnesses:
 G. L. CRAGG,
 LEON G. STROH.